United States Patent
Byun et al.

(10) Patent No.: US 8,435,659 B2
(45) Date of Patent: May 7, 2013

(54) RECHARGEABLE BATTERY

(75) Inventors: Sang-Won Byun, Suwon-si (KR);
Yong-Sam Kim, Suwon-si (KR);
Byung-Kyu Ahn, Suwon-si (KR);
Dae-Won Han, Suwon-si (KR);
Sung-Bae Kim, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 400 days.

(21) Appl. No.: 12/654,549

(22) Filed: Dec. 23, 2009

(65) Prior Publication Data

US 2010/0167107 A1    Jul. 1, 2010

(30) Foreign Application Priority Data

Dec. 26, 2008 (KR) .................. 10-2008-0134827

(51) Int. Cl.
*H01M 2/04* (2006.01)
*H01M 2/34* (2006.01)

(52) U.S. Cl.
USPC .................. 429/61; 429/7; 429/178; 429/175

(58) Field of Classification Search ............... 429/61, 429/178
See application file for complete search history.

(56) References Cited

U.S. PATENT DOCUMENTS

| 5,766,790 A | 6/1998 | Kameishi et al. |
| 8,178,235 B2 * | 5/2012 | Cheon et al. .................. 429/163 |
| 2003/0013005 A1 * | 1/2003 | Chang ............................. 429/53 |
| 2008/0038627 A1 * | 2/2008 | Yamauchi et al. ............. 429/53 |

FOREIGN PATENT DOCUMENTS

| JP | 08-293301 A | 11/1996 |
| JP | 09-180698 A | 7/1997 |
| JP | 11-204094 A | 7/1999 |
| JP | 2005-251548 A | 9/2005 |
| KP | 10-2005-0110499 A | 11/2005 |

* cited by examiner

*Primary Examiner* — John S Maples
(74) *Attorney, Agent, or Firm* — Lee & Morse, P.C.

(57) ABSTRACT

A rechargeable battery including: an electrode assembly with a positive electrode, a negative electrode and a separator interposed therebetween; a case housing the electrode assembly; a cap plate connected to the case; a first terminal and a second terminal protruding from an upper part of the cap plate; and a current interrupt module electrically connected to the electrode assembly and the first terminal, wherein the current interrupt module includes a current interrupt unit coupled to the electrode assembly and the current interrupt unit is configured to uncouple from the electrode assembly when an internal pressure of the case increases.

16 Claims, 6 Drawing Sheets

RECHARGEABLE BATTERY

Korean Patent Application No. 10-2008-0134827, filed on Dec. 26, 2008, in the Korean Intellectual Property Office, and entitled: "Rechargeable Battery," is incorporated by reference herein in its entirety.

BACKGROUND

1. Technical Field

Embodiments relate to a rechargeable battery. More particularly, embodiments relate to a rechargeable battery having a current interrupt module.

2. Description of the Related Art

A rechargeable battery may be capable of being repeatedly charged and discharged, unlike a primary battery. A low capacity rechargeable battery may be used to power a small electronic device, e.g., a mobile phone, a laptop computer, and a camcorder. A large capacity battery may be widely used as a power source for, e.g., driving a motor of a hybrid vehicle.

Recently, a high power rechargeable battery using high energy density non-aqueous electrolyte has been introduced. The high power rechargeable battery may be formed from a plurality of rechargeable batteries coupled in series to be used for a device requiring high power, e.g., for driving a motor for an electric vehicle.

Also, one large capacity rechargeable battery may be formed of a plurality of rechargeable batteries having, e.g., a cylindrical shape and a rectangular shape, coupled in series.

The rectangular rechargeable battery may include an electrode assembly having a positive electrode, a negative electrode and a separator interposed therebetween, a case having a space for housing the electrode assembly, a cap plate for closing and sealing the case and having a terminal hole to insert an electrode terminal and an electrode terminal electrically connected to the electrode assembly and protruding externally from the case through the terminal hole.

When a conventional rechargeable battery is overcharged, a surface temperature of a case and a temperature of a vent may increase abruptly. Also, voltage abruptly increases if the state of charge (SOC) is higher than about 160%. If the conventional rectangular rechargeable battery is continuously overcharged, the battery may expand or life-span may be abruptly deteriorated.

Such a problem may become more significant in a rectangular battery. Since the rectangular battery may include a positive electrode terminal and a negative electrode terminal protruding from the cap plate, it may be very difficult to form a structure for interrupting current. Alternatively, a cylindrical battery may have a structure for interrupting current because a positive electrode terminal may be formed at an upper portion and the case may operate as a negative electrode terminal in the cylindrical battery.

SUMMARY

Embodiments are therefore directed to a rechargeable battery, which substantially overcomes one or more of the problems due to the limitations and disadvantages of the prior art.

It is therefore a feature of an embodiment to provide a rechargeable battery having a current interrupt unit which prevents overcharge At least one of the above and other features and advantages may be realized by providing a rechargeable battery, including an electrode assembly including a positive electrode, a negative electrode and a separator interposed therebetween, a case housing the electrode assembly, a cap plate connected to the case, a first terminal and a second terminal protruding from an upper part of the cap plate, and a current interrupt module electrically connected to the electrode assembly and the first terminal, wherein the current interrupt module includes a current interrupt unit coupled to the electrode assembly and the current interrupt unit is configured to uncouple from the electrode assembly when an internal pressure of the case increases.

The current interrupt module may include a sub-plate electrically connected to the electrode assembly and a middle plate disposed between the sub-plate and the cap plate, and the middle plate may include a convex member protruding toward the sub-plate and coupled to the sub-plate.

The current interrupt unit may include a welding part between the sub-plate and the middle plate.

The cap plate may include a bottom surface and a groove on the bottom surface, and the groove may be configured to accept the middle plate.

The rechargeable battery may further include an insulating member interposed between the middle plate and the sub-plate, wherein the insulating member includes a hole, and the convex member passes through the hole.

The insulating member may include a first insulating unit between the cap plate and a lead member coupled to the electrode assembly, and a second insulating unit between the sub-plate and the middle plate, and the first insulating unit and the second insulating unit are integrally formed.

The insulating member may include a lower support unit that supports the sub-plate.

The convex member may have a plate structure with a rounded cross-section.

The convex member may be configured to protrude toward the cap plate after separating from the sub-plate when an internal pressure of the rechargeable battery increases above a predetermined pressure.

The middle plate may include a frame extending flatly along a circumference of the convex member, and a notch at a boundary of the frame and the convex member.

The convex member may include a surface and a notch on the surface, and the notch may be configured to break and discharge gas at a predetermined pressure.

The rechargeable battery may further include a lead member coupled to the electrode assembly and a connection member coupled to the lead member and the sub-plate.

The first terminal and the current interrupt module may be electrically connected to the cap plate.

The first terminal may be coupled to a top surface of the cap plate.

The first terminal may include a pillar having an end and an expansion protruding from the end of the pillar, and the expansion may contact a top surface of the cap plate.

The case may be a prismatic type.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
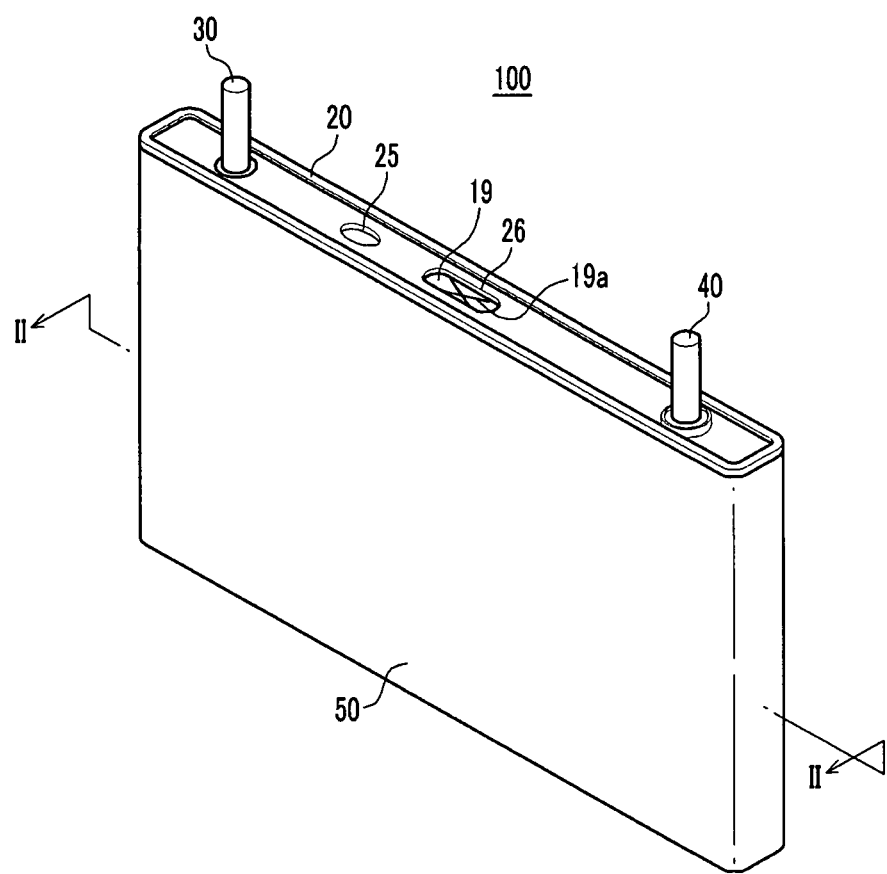
FIG. 1 illustrates a perspective view of a rechargeable battery according to an embodiment.

Korean Patent Application No. 10-2008-0134827, filed on Dec. 26, 2008, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a metal" may represent a single compound, e.g., aluminum, or multiple compounds in combination, e.g., aluminum mixed with nickel.

Figure 2:
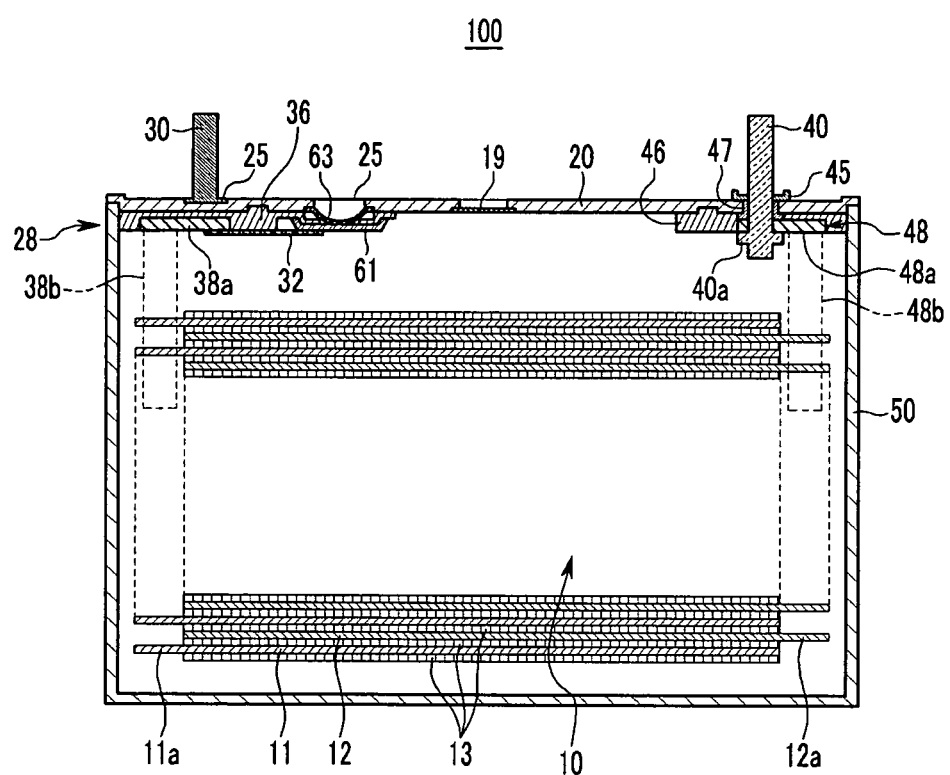
FIG. 2 illustrates a cross-sectional view of the rechargeable battery shown in FIG. 1 taken along the line II-II.
Figure 3:
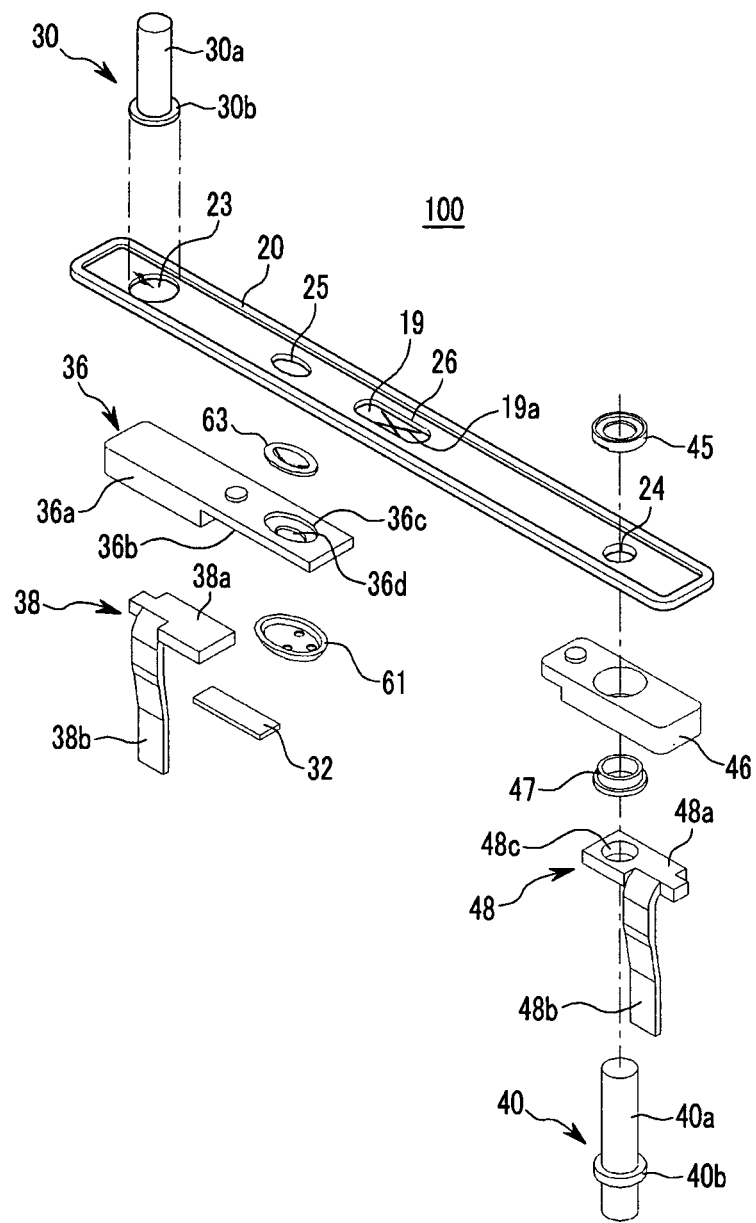
FIG. 3 illustrates an exploded perspective view of a cap plate of the rechargeable battery shown in FIG. 1.

FIG. 1 illustrates a perspective view of a rechargeable battery according to an embodiment. FIG. 2 illustrates a vertical cross-sectional view of FIG. 1 taken along the line II-II. FIG. 3 illustrates an exploded perspective view of a cap plate of FIG. 1 with members.

Referring to FIG. 1, FIG. 2 and FIG. 3, the rechargeable battery 100 according to an embodiment may include an electrode assembly 10 having a positive electrode 11 and a negative electrode 12 spiral-wound with a separator 13 interposed therebetween as an insulator, a case 50 for housing the electrode assembly 10, first and second terminals 30 and 40 electrically connected to the electrode assembly 10 and a cap plate 20 coupled to an opening in the case 50.

The positive electrode 11 and the negative electrode 12 may include a coated region and uncoated regions 11a and 12a. The coated region may be a part of a current collector formed of a thin plate of a metal foil, which may be coated with active material. The uncoated regions 11a and 12a may be parts that are not coated with active material. The uncoated regions 11a and 12a may be formed at a side of the positive electrode 11 and the negative electrode 12 in a direction substantially parallel to the positive electrode 11 and the negative electrode 12. The positive electrode 11 and the negative electrode 12 may be spiral-wound with the separator 13 as an insulator in a jelly-roll shape, thereby forming the electrode assembly 10.

The first terminal 30 may be electrically connected to the second terminal 40 through lead members 38 and 48, the uncoated regions 11a and 12a and the electrode assembly 10.

The first terminal 30 may be electrically connected to a positive electrode uncoated region 11a, thereby forming a positive electrode terminal. The second terminal 40 may be electrically connected to a negative electrode uncoated region 12a, thereby forming a negative electrode terminal. Although the first terminal 30 may be the positive electrode terminal and the second terminal 40 may be the negative electrode terminal in the embodiment, the embodiments are not limited thereto. The first terminal 30 may be a negative electrode terminal, and the second terminal 40 may be a positive electrode terminal.

The case 50 may internally include a space. The case 50 may be, e.g., a prismatic type case formed in a hexahedral shape. The case 50 may have one open side.

The cap plate 20 may be formed of a thin plate. The cap plate 20 may include a mounting groove 23 for mounting the first terminal 30 and a terminal hole 24 for inserting the second terminal 40. Also, the cap plate 20 may include a vent 19 that opens at a predetermined internal pressure. A notch 19a may be formed in the vent 19. The vent 19 may be mounted in the vent hole 26 on the cap plate 20.

The first terminal 30 may include a pillar 30a protruding upward from the cap plate 20 and an expansion 30b extending circumferentially from a lower end of the pillar 30a. The expansion 30b may be inserted into the mounting groove 23 and coupled to the cap plate 20 through, e.g., welding. Thus, the first terminal 30 and the cap plate 20 may be electrically connected. The expansion 30b according to an embodiment may make it easy to weld the first terminal 30 to the cap plate 20. Welding with the expansion 30b may ease welding because heat is not easily diffused and the expansion 30b melts easily because it is not too thick. Accordingly, if the expansion 30b is formed according to such an embodiment, a welding process may be effectively performed because the welding may be performed by heating the expansion 30b after inserting the expansion 30b into the mounting groove 23.

The second terminal 40 may include a pillar 40a and a protrusion 40b that protrudes circumferentially at an outer side of the pillar 40a and catches under the cap plate 20. The second terminal 40 may externally protrude through a terminal hole 24 formed in the cap plate 20. An upper gasket 45 and a lower gasket 47 may be interposed between the cap plate 20 and the second terminal 40 and may insulate the cap plate 20 and the second terminal 40.

The lower gasket 47 may be inserted into the terminal hole 24, and the upper gasket 45 may be disposed on the cap plate 20. A nut and a washer may be disposed over the second terminal 40. The nut may be connected to the second terminal 40 on the upper gasket 45 to support the second terminal 40 on the cap plate 20, and the washer may absorb fastening force.

Under the cap plate 20, a second insulating member 46 may insulate the second terminal 40 and the second lead member 48 from the cap plate 20. The second insulating member 46 may include a hole to receive the second terminal 40 and the lower gasket 47.

The second lead member 48 may be disposed under the lower gasket 47. The second lead member 48 may include an upper plate 48a and an adhesive plate 48b protruding downward from the upper plate 48a. The adhesive plate 48b may be coupled to the negative electrode uncoated region 12a. The upper plate 48a may include a hole 48c to receive the second terminal 40.

Accordingly, the second terminal 40 may protrude above the cap plate 20 after passing through the second lead member 48, the lower gasket 47, the second insulating member 46, the cap plate 20 and the upper gasket 45. The second terminal 40 may be stably insulated from the cap plate 20 due to the second insulating member 46, the lower gasket 47 and the upper gasket 45.

Figure 4:
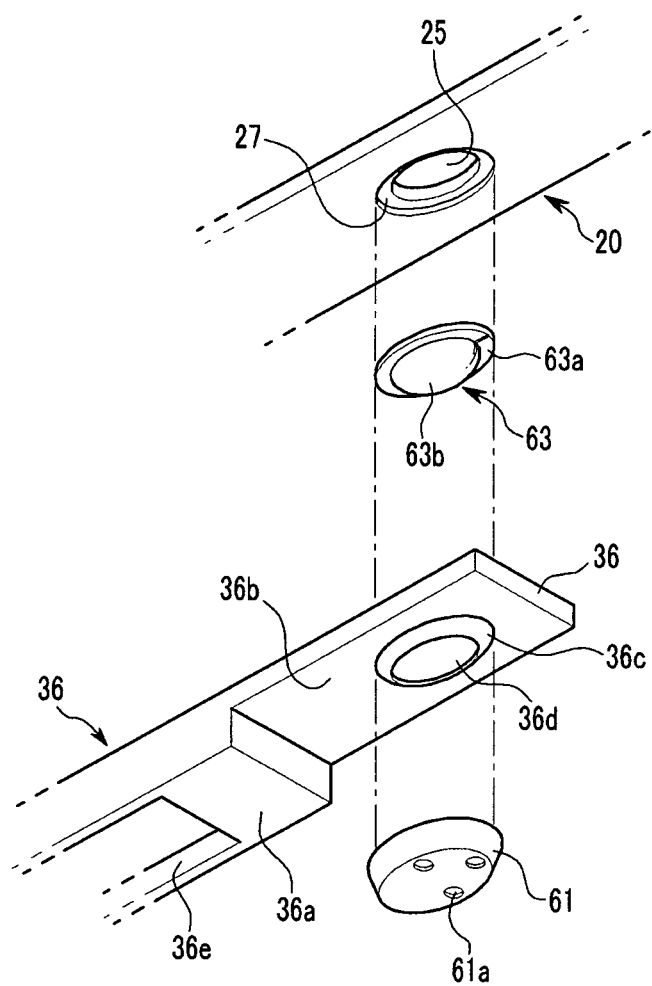
FIG. 4 illustrates an exploded perspective view of members of a cap plate according to an embodiment.
Figure 5:
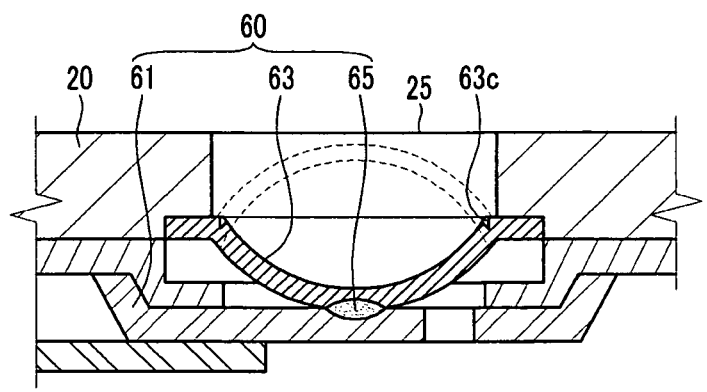
FIG. 5 illustrates a cross-sectional view of the cap plate shown in FIG. 4 with members assembled.

FIG. 4 illustrates an exploded perspective view of members of a cap plate according to an embodiment, and FIG. 5 illustrates a cross-sectional view of the cap plate shown in FIG. 4 with members assembled.

Referring to FIG. 3, FIG. 4 and FIG. 5, the rechargeable battery 100 according to an embodiment may include a current interrupt module 60 electrically connected to the first terminal 30 and having a current interrupt unit 65 joined through, e.g., welding. The current interrupt module 60 may include a middle plate 63 disposed under the cap plate 20 and electrically connected to the cap plate 20, a sub-plate 61 disposed under the middle plate 63 and coupled to the middle plate 63 through, e.g., welding, and a current interrupt unit 65 formed by joining the middle plate 63 and the sub-plate 61 through, e.g., welding.

The middle plate 63 may include a frame 63a formed flatly along a circumference and a convex member 63b protruding from the frame 63a towards the sub-plate 61. The convex member 63b may form a curved plate having a, e.g., rounded or hemispherical shape, and may be connected to the sub-plate 61 through, e.g., welding.

A groove 27 may be formed at a bottom surface of the cap plate 20. The frame 63a of the middle plate 63 may be inserted into the groove 27. An open hole 25 may be formed at the center of the groove 27 in order to allow the convex member 63b to protrude upward when the convex member 63b is separated from the sub-plate 61, inverted and deformed.

The sub-plate 61 may be concave to house the convex member 63b, and a plurality of holes 61a may be formed a bottom surface of the sub-plate 61. The internal pressure of the case 50 may be transferred to the middle plate 63 through the plurality of holes 61a. The bottom surface of the convex unit 63b may be connected to the center of the sub-plate 61 through, e.g., welding. A welded part thereof may become the current interrupt unit 65.

A first insulating member 36 may be disposed between the sub-plate 61 and the middle plate 63. In the first insulating member 36, a lower support member 36c may support the sub-plate 61 by protruding toward the sub-plate 61, and a hole 36d may be formed at a center of the lower support unit 36c. As described above, the sub-plate 61 may include a top end in contact with the first insulating member 36 and a bottom end in contact with the lower support member 36c.

The convex unit 63b may be connected to the sub-plate 61 through, e.g., welding after being inserted through the hole 36d of the first insulating member 36. The welded part may form the current interrupt unit 65.

The sub-plate 61 may be electrically connected to the first lead member 38 through the connection member 32. The connection member 32 may be formed in a plate shape, and may be connected to a lower surface of the first lead member 38 and a lower surface of the sub-plate 61 through, e.g., welding.

Meanwhile, the first lead member 38 may include an upper plate 38a and an adhesive plate 38b protruding downward from the upper plate 38a and coupled to a negative electrode uncoated region 12a of the electrode assembly 10.

The first insulating member 36 may include a lead insulating unit 36a disposed between the first lead member 38 and the cap plate 20, and a sub-insulating unit 36b disposed between the sub-plate 61 and the middle plate 63.

The lead insulating unit 36a and the sub-insulating member 36b may be integrally formed. The lead insulating member 36a may have a thinner thickness than the sub-insulating unit 36b. The lead insulating unit 36a may include a groove 36e for inserting the upper plate 38a of the first lead member 38, and the sub-insulating member 36b may include a lower support unit 36c and a hole 36d at a center of the lower support unit 36c. The lower support unit 36c may protrude downward and a space may be formed at the upper side of the lower support member 36c to house the convex unit 63b. If the lead insulating unit 36a and the sub-insulating unit 36b are integrally formed as described above, it may be possible to effectively insulate the first lead member 38 and the sub-plate 61 through one member.

As described above, current may be transferred from the positive electrode uncoated region 11a to the cap plate 20 through the first lead member 38, the connection member 32, the sub-plate 61 and the middle plate 63. The current may flow to the outside through first terminal 30 disposed on the cap plate 20.

As shown in FIG. 5, if an internal pressure of the case 50 increases, the convex member 63b may separate from the current interrupt unit 65. Thus, the convex member 63b may separate from the sub-plate 61 and deform to protrude upward. In an implementation, a notch 63c may be formed where the convex member 63b contacts the frame 63a to help ensure that the convex member 63b may be easily deformed. By forming the notch 63c as described above, the separated convex member 63b may be easily deformed. The pressure that causes the middle plate 63 to separate from the sub-plate 61 may be controlled through the strength of welding.

If the middle plate 63 is formed to separate from the sub-plate 61 at a predetermined pressure as described above, it may be possible to prevent an overcharge because the electrical connection between the sub-plate 61 and the middle plate 63 may be interrupted.

Also, a current interruption pressure may be easily set by controlling the weld strength of the current interrupt unit 65. Further, it may be possible to set the displacement of the convex member 63b to be great because the current interrupt unit 65 may be formed at a center of the convex member 63b and the convex member 63b may be deformed and inversed. Accordingly, it may be possible to prevent undesirable arc generation when current is interrupted. Since the convex member 63b may instantly inverse and protrude upward, the convex member 63b may deform to a distance greater than can generate an arc. Therefore, arc generation may be prevented.

Figure 8:
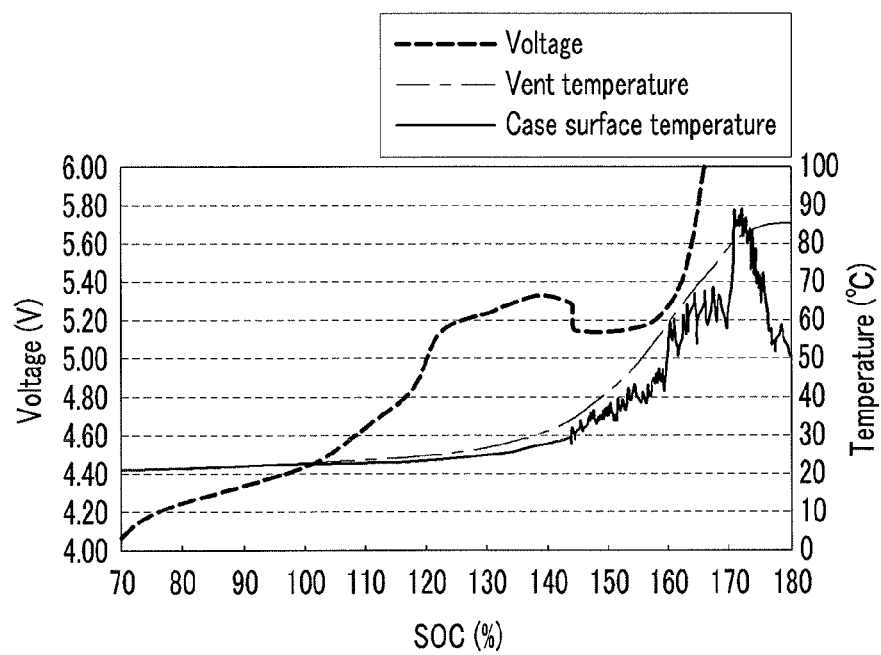
FIG. 8 illustrates a graph showing voltage and temperature according to a SOC of a conventional rechargeable battery.

FIG. 8 illustrates a graph showing voltage and temperature according to state of charge (SOC) of a conventional rechargeable battery. As shown in FIG. 8, when the conventional rechargeable battery is overcharged, a surface temperature of a case and a temperature of a vent may increase abruptly. Also, voltage may abruptly increase if SOC is higher than 160%. If a conventional rectangular rechargeable battery is continuously overcharged, the battery may expand or lifespan may be abruptly deteriorated.

Figure 6:
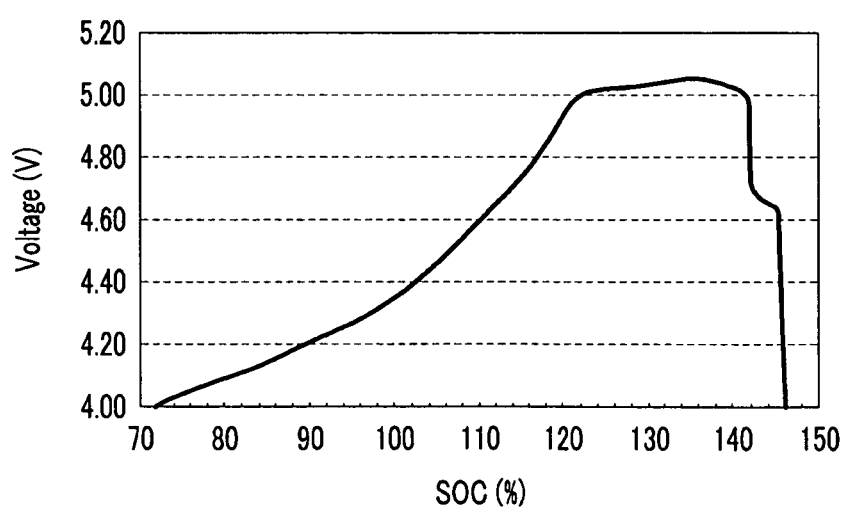
FIG. 6 illustrates a graph showing voltage variation according to a state of charge (SOC) of a rechargeable battery according to an embodiment.

FIG. 6 illustrates a graph showing voltage variation according to the SOC of a rechargeable battery according to an embodiment. Referring to FIG. 6, when SOC is 140%, current may be interrupted due to overcharge, and a voltage of a rechargeable battery may be abruptly dropped. Therefore, it may be possible to prevent a rechargeable battery from, e.g., catching fire or exploding due to overcharge. Since it may prevent a malfunction, safety of a rechargeable battery may be improved.

Figure 7:
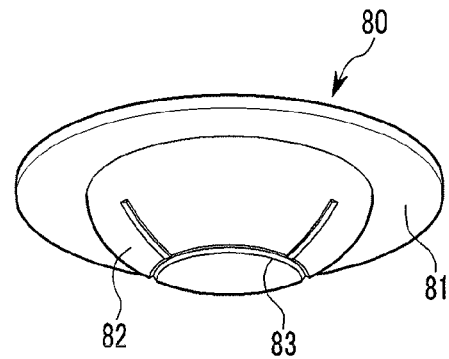
FIG. 7 illustrates a perspective view of a middle plate according to another embodiment.

FIG. 7 illustrates a perspective view of a middle plate according to another embodiment. Referring to FIG. 7, the rechargeable battery according to the embodiment may have a structure identical to the rechargeable battery of the first exemplary embodiment except for the structure of the middle plate 80. Therefore, the same drawing reference numerals are used for the same elements, and repeated explanation of them will be omitted.

As shown in FIG. 7, the middle plate 80 according to the present embodiment may include a convex member 82 protruding downward and a frame 81 formed flatly along a circumference of the convex unit 82.

The convex unit 82 may be connected to the sub-plate 61 through, e.g., welding as described above, and a notch 83 may be formed at a surface of the convex member 82. If an internal pressure continuously increases after the convex member 82 is separated from the sub-plate 61, the notch 83 may be broken and gas generated inside may be discharged in order to prevent an explosion. By forming the notch 83 at the convex member 82 as described above, it may be possible to interrupt the current as well as discharge gas using one member.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
  an electrode assembly including a positive electrode, a negative electrode and a separator interposed therebetween;
  a case housing the electrode assembly;
  a cap plate connected to the case;
  a first terminal and a second terminal protruding from an upper part of the cap plate; and
  a current interrupt module electrically connected to the electrode assembly and the first terminal, wherein the current interrupt module includes a current interrupt unit coupled to the electrode assembly and the current interrupt unit is configured to uncouple from the electrode assembly when an internal pressure of the case increases, the current interrupt unit including a middle plate that includes a frame and a convex member contiguous with the frame, the frame being in direct contact with the cap plate, the convex member projecting away from the cap plate and being configured to invert, inversion of the convex member causing the convex member to protrude into a groove formed at a bottom surface of the cap plate.

2. The rechargeable battery as claimed in claim 1, wherein:
  the current interrupt module includes a sub-plate electrically connected to the electrode assembly, and
  the middle plate is disposed between the sub-plate and the cap plate, the convex member protruding toward the sub-plate and being coupled to the sub-plate.

3. The rechargeable battery as claimed in claim 2, wherein the current interrupt unit includes a welding part between the sub-plate and the middle plate.

4. The rechargeable battery as claimed in claim 2, wherein the groove is configured to accept the middle plate.

5. A rechargeable battery, comprising:
  an electrode assembly including a positive electrode, a negative electrode and a separator interposed therebetween;
  a case housing the electrode assembly;
  a cap plate connected to the case;
  a first terminal and a second terminal protruding from an upper part of the cap plate;
  a current interrupt module electrically connected to the electrode assembly and the first terminal, wherein the current interrupt module includes a current interrupt unit coupled to the electrode assembly and the current interrupt unit is configured to uncouple from the electrode assembly when an internal pressure of the case increases, wherein the current interrupt module includes a sub-plate electrically connected to the electrode assembly and a middle plate disposed between the sub-plate and the cap plate, and the middle plate includes a convex member protruding toward the sub-plate and coupled to the sub-plate; and
  an insulating member interposed between the middle plate and the sub-plate, wherein the insulating member includes a hole, and the convex member passes through the hole.

6. The rechargeable battery as claimed in claim 5, wherein the insulating member includes a first insulating unit between the cap plate and a lead member coupled to the electrode assembly, and a second insulating unit between the sub-plate and the middle plate, and the first insulating unit and the second insulating unit are integrally formed.

7. The rechargeable battery as claimed in claim 5, wherein the insulating member includes a lower support unit that supports the sub-plate.

8. The rechargeable battery as claimed in claim 2, wherein the convex member is configured to protrude toward the cap plate after separating from the sub-plate when an internal pressure of the rechargeable battery increases above a predetermined pressure.

9. The rechargeable battery as claimed in claim 2, wherein the middle plate includes the frame extending flatly along a circumference of the convex member, and a notch at a boundary of the frame and the convex member.

10. The rechargeable battery as claimed in claim 2, wherein the convex member includes a surface and a notch on the surface, and the notch is configured to break and discharge gas at a predetermined pressure.

11. The rechargeable battery as claimed in claim 2, further comprising a lead member coupled to the electrode assembly and a connection member coupled to the lead member and the sub-plate.

12. The rechargeable battery as claimed in claim 1, wherein the first terminal and the current interrupt module are electrically connected to the cap plate.

13. The rechargeable battery as claimed in claim 1, wherein the first terminal is coupled to a top surface of the cap plate.

14. The rechargeable battery as claimed in claim 1, wherein the first terminal includes a pillar having an end and an expansion protruding from the end of the pillar, and the expansion contacts a top surface of the cap plate.

15. The rechargeable battery as claimed in claim 1, wherein the case is a prismatic type.

16. The rechargeable battery as claimed in claim 1, wherein the convex member has a hemispherical cross-section.

* * * * *